UNITED STATES PATENT OFFICE.

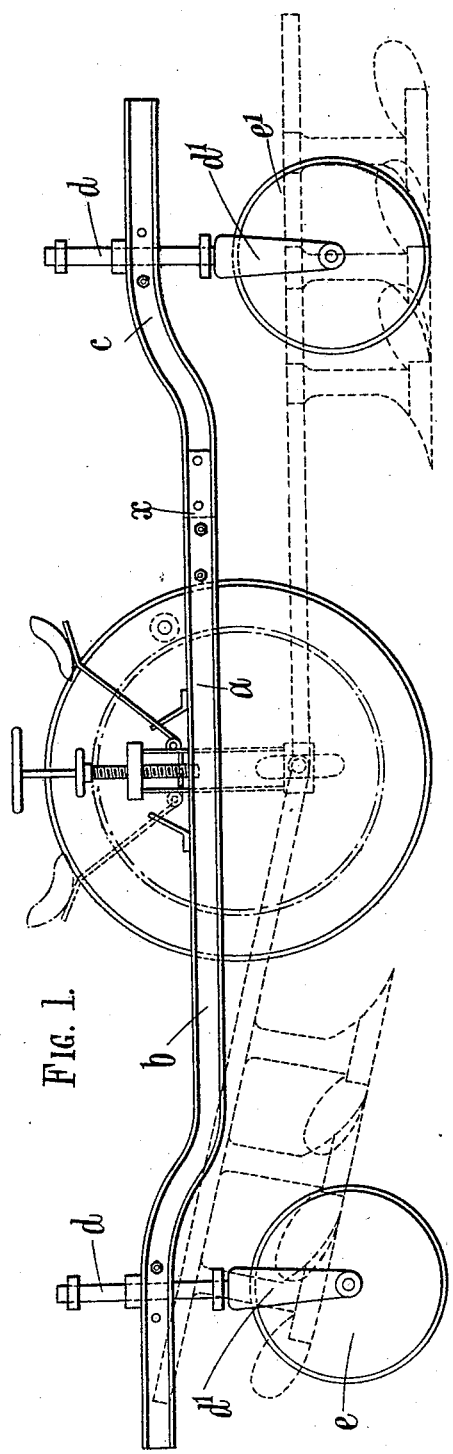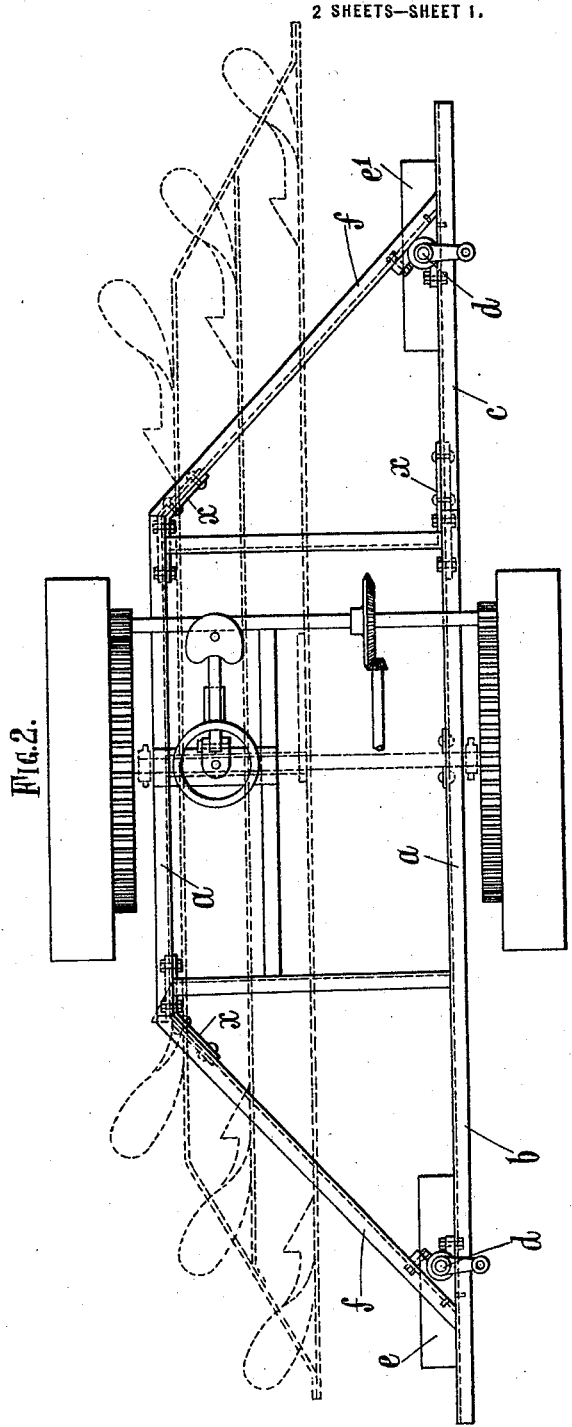

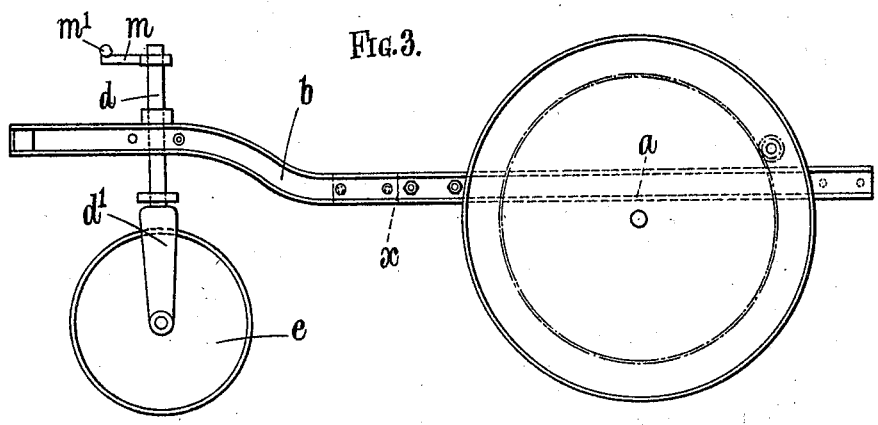
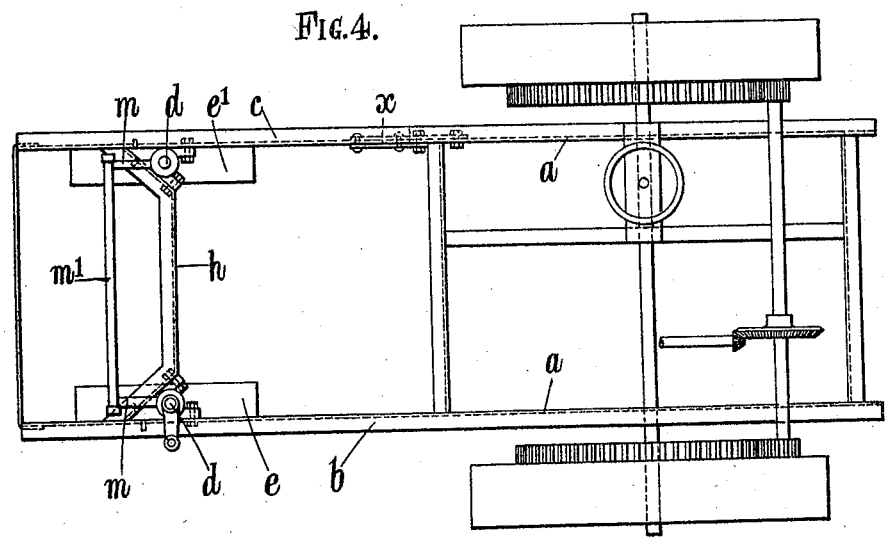

ERNEST RICHARD PELLING, OF CROYDON, AND VICTOR ALEXANDER MATTICK, OF BECKENHAM, ENGLAND.

MOTOR TRACTOR.

1,412,132.  Specification of Letters Patent.  Patented Apr. 11, 1922.

Application filed September 2, 1921. Serial No. 498,024.

*To all whom it may concern:*

Be it known that we, ERNEST RICHARD PELLING, a subject of the King of Great Britain and Ireland, residing at the Engineer's House, Selsdon Park, Croydon, in the county of Surrey, England, and VICTOR ALEXANDER MATTICK, a subject of the King of Great Britain and Ireland, residing at 83 St. James Avenue, Beckenham, in the county of Kent, England, have invented a new and useful Improvement in Motor Tractors, (for which we have obtained a patent in Great Britain, October 31, 1919, Patent No. 149,153,) of which the following is a full and complete specification.

This invention relates to motor tractors and has for its object a construction which is specially adapted for the haulage of plows of the one-way type and which can be readily converted into a tractor suitable for general haulage purposes.

We attain this end by the construction hereinafter more particularly specified and shown in the accompanying drawings in which:—

Figs. 1 and 2 are views in side elevation and plan respectively showing the tractor arranged for hauling a one-way plow, and Figs. 3 and 4 are similar views showing the tractor converted for use for general haulage purposes.

Throughout the views similar parts are marked with like letters of reference.

The tractor comprises essentially a central or main frame having a transverse axle carrying two driving wheels, the power unit, the variable speed and reverse gearing and the transmission gear all of which may be of any suitable type, and as they form no part per se of the present invention call for no further description.

On one side of the main frame $a$ at one end thereof is permanently attached an extension arm $b$, and on the same side of said main frame at the opposite end thereof is detachably attached by means of fish plates $x$ or the like another extension arm $c$. On each of these extension arms preferably on the inner sides thereof are steering heads $d$ adapted to carry the forks $d'$ carrying the steering wheels $e$ and $e'$. Said extension arms are braced to the main frame by diagonally arranged stay bars $f$ which are secured to said extension arms and to said main frames by means of fish plates $x$ or any other suitable rigid and detachable couplings.

When it is desired to convert the tractor as arranged for plowing to a tractor for general haulage purposes the stay bars $f$ are first removed, the detachable extension arm $c$ is then removed from the main frame and is fixed to the same end of said main frame as the extension arm $b$ so as to bring the steering wheel $e'$ to the same end of the main frame as the steering wheel $e$ and said two extension arms are braced together by means of a suitably shaped cross member $h$ which is fixed to said extension arms by means of bolts or the like. The steering wheel $e'$ carried by the detachable extension arm $c$ is coupled to the steering wheel $e$ carried by the permanently fixed extension arm $b$ by means of arms $m$ and $m$ and a coupling link $m'$ so that the motion imparted to the permanently located steering wheel $e$ is also communicated to the steering wheel $e'$.

What we claim is:—

1. A motor tractor comprising a main frame supported by two driving wheels and adapted to carry the power unit and the transmission gear from said power unit to said wheels, two beams extending from the opposite ends of the main frame on the same side thereof one of said beams being a permanent fixture to said frame and the other being detachable from said frame and capable of attachment to either end thereof, a steering wheel carried by each of said beams and means for coupling the two beams together at one end of the main frame.

2. A motor tractor comprising a main frame supported by two driving wheels and adapted to carry the power unit and the transmission gear from said power unit to said wheels, two beams extending from the opposite ends of the main frame on the same side thereof one of said beams being permanently fixed to said frame and the other of said beams being detachably attached to said frame and adapted to be attached to either end thereof, a steering wheel carried by each of said beams, detachable stay bars attached to said beams near their free ends and attached to the main frame on the opposite sides thereof and means for coupling the two beams together at one end of the main frame.

3. A motor tractor comprising a main frame supported by two driving wheels, two extension beams one at each end of the main frame and both on one side thereof one of said beams being permanently fixed to said frame and the other detachably mounted on said frame and capable of being shifted and fixed to the other end of the main frame so as to be parallel with the fixed beam, a head or socket carried by each of said beams, a fork mounted in each head or socket, a steering wheel mounted in each said fork, stay bars operating between the beams and the main frame, means for securing the free ends of the two beams to one another, coupling mechanism between the two steering wheels, and controlling mechanism for operating said steering wheels through said coupling means.

4. A motor tractor comprising a main frame supported by two driving wheels, two extension beams one at each end of the main frame and both on one side thereof one of said beams being integral with the main frame and the other of said beams being detachable from said main frame and adapted to be fixed to either end of said frame a head or socket mounted on the inner side of each of said beams, a fork mounted in each head or socket, a steering wheel mounted in each said fork, a cushioning spring located between the top of each said forks and the underside of each of said heads or sockets, stay bars detachably attached to the free ends of said beams and to the main frame, means for coupling the free ends of the two beams together when they are located at the same end of the main frame, coupling mechanism between the two steering wheels, and controlling mechanism for operating said steering wheels through said coupling means.

ERNEST RICHARD PELLING.
    VICTOR ALEXANDER MATTICK.